US012571888B2

(12) United States Patent
Zhou et al.

(10) Patent No.: US 12,571,888 B2
(45) Date of Patent: Mar. 10, 2026

(54) UNIFIED PHOTODETECTOR AND ELECTRODE ARRAY

(71) Applicant: Beijing Voyager Technology Co., Ltd., Beijing (CN)

(72) Inventors: Qin Zhou, Mountain View, CA (US); Youmin Wang, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 1320 days.

(21) Appl. No.: 17/326,982

(22) Filed: May 21, 2021

(65) Prior Publication Data

US 2022/0373657 A1 Nov. 24, 2022

(51) Int. Cl.
*G01S 7/4863* (2020.01)
*G01S 17/931* (2020.01)

(52) U.S. Cl.
CPC .......... *G01S 7/4863* (2013.01); *G01S 17/931* (2020.01)

(58) Field of Classification Search
CPC .... G01S 7/4863; G01S 17/931; G01S 7/4816; G01S 17/42
See application file for complete search history.

(56) References Cited

U.S. PATENT DOCUMENTS

| | | | |
|---|---|---|---|
| 5,569,942 A | 10/1996 | Kusakabe | |
| 7,714,292 B2 | 5/2010 | Agarwal et al. | |
| 9,246,041 B1 | 1/2016 | Clausen et al. | |
| 10,594,965 B2 | 3/2020 | Oh | |
| 10,775,486 B2 | 9/2020 | Gunnam et al. | |
| 2016/0099429 A1 | 4/2016 | Bruder et al. | |
| 2017/0363465 A1 | 12/2017 | Send et al. | |
| 2018/0007343 A1* | 1/2018 | Send | H04N 23/74 |
| 2019/0162866 A1* | 5/2019 | Radivojevic | G01T 1/247 |
| 2019/0172964 A1* | 6/2019 | Hermes | H10F 39/191 |
| 2021/0011128 A1* | 1/2021 | Shi | G01S 7/4815 |
| 2021/0356597 A1* | 11/2021 | Hurwitz | G01S 17/36 |

FOREIGN PATENT DOCUMENTS

| | | | |
|---|---|---|---|
| KR | 20190002727 A | 1/2019 | |

OTHER PUBLICATIONS

PCT/US2022/029202 , "International Preliminary Report on Patentability", Nov. 30, 2023, 7 pages.
PCT/US2022/029202 , "International Search Report and Written Opinion", Sep. 7, 2022, 10 pages.

* cited by examiner

*Primary Examiner* — Thanh Luu
*Assistant Examiner* — Mai Thi Ngoc Tran
(74) *Attorney, Agent, or Firm* — Kilpatrick Townsend & Stockton LLP

(57) ABSTRACT

A photodetector is made sufficiently large to receive an entire designed field of view (e.g., for a LiDAR system). At least one lens is mounted to direct reflected laser beams to the photodetector. A plurality of electrodes (e.g., 16, 32 or 64) are coupled to the photodetector, each electrode corresponding to a different pixel position. A processor is coupled to the plurality of electrodes and the processor is configured to detect a pixel position of a reflected laser beam by detecting which electrode produces the largest digital signal.

14 Claims, 12 Drawing Sheets

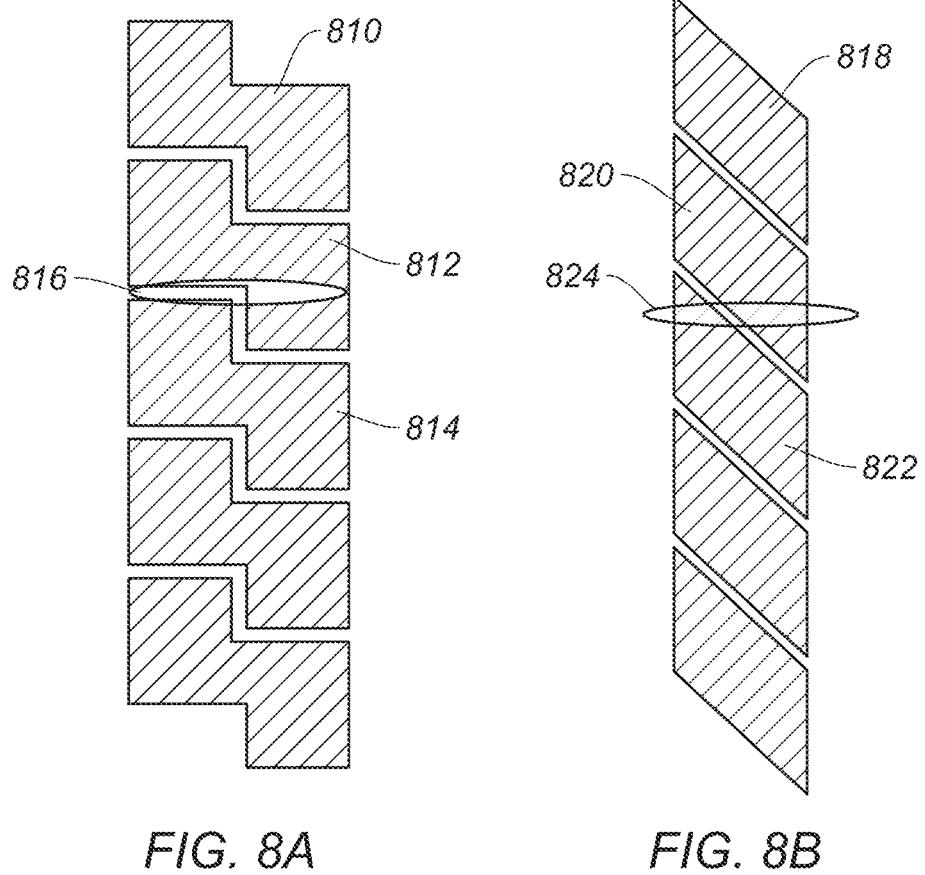
*FIG. 8A*           *FIG. 8B*

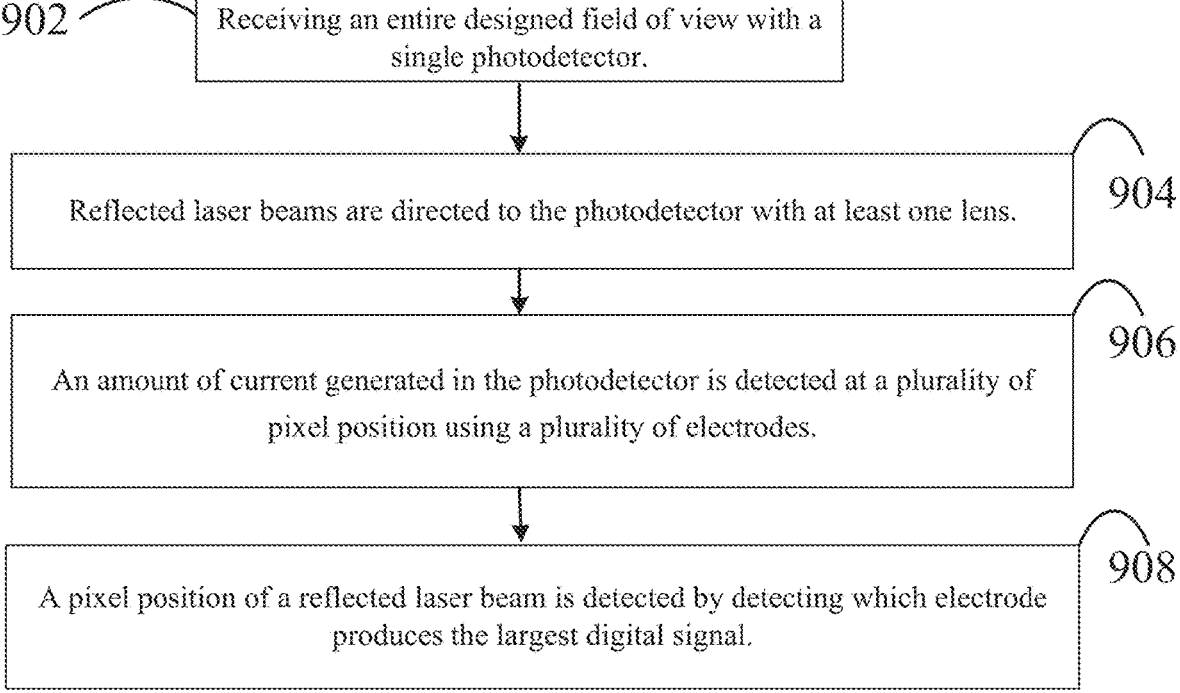

902 Receiving an entire designed field of view with a single photodetector.

904 Reflected laser beams are directed to the photodetector with at least one lens.

906 An amount of current generated in the photodetector is detected at a plurality of pixel position using a plurality of electrodes.

908 A pixel position of a reflected laser beam is detected by detecting which electrode produces the largest digital signal.

FIG. 9

UNIFIED PHOTODETECTOR AND ELECTRODE ARRAY

BACKGROUND OF THE INVENTION

Unless otherwise indicated herein, the materials described in this section are not prior art to the claims in this application and are not admitted to be prior art by inclusion in this section. In particular, disparate technologies are discussed that it would not be obvious to discuss together absent the teachings of the present invention.

Modern vehicles are often equipped with sensors designed to detect objects and landscape features around the vehicle in real-time to enable technologies such as lane change assistance, collision avoidance, and autonomous driving. Some commonly used sensors include image sensors (e.g., infrared or visible light cameras), acoustic sensors (e.g., ultrasonic parking sensors), radio detection and ranging (RADAR) sensors, magnetometers (e.g., passive sensing of large ferrous objects, such as trucks, cars, or rail cars), and light detection and ranging (LiDAR) sensors.

A LiDAR system typically uses a light source and a light detection system to estimate distances to environmental features (e.g., pedestrians, vehicles, structures, plants, etc.). For example, a LiDAR system may transmit a light beam (e.g., a pulsed laser beam) to illuminate a target and then measure the time it takes for the transmitted light beam to arrive at the target and then return to a receiver near the transmitter or at a known location. In some LiDAR systems, the light beam emitted by the light source may be steered across a two-dimensional or three-dimensional region of interest according to a scanning pattern, to generate a "point cloud" that includes a collection of data points corresponding to target points in the region of interest. The data points in the point cloud may be dynamically and continuously updated, and may be used to estimate, for example, a distance, dimension, location, and speed of an object relative to the LiDAR system.

In a LiDAR system, light steering is used. Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc., and can be configured to perform both transmission and reception of light. For example, a light steering transmitter may include a micro-mirror to control the projection direction of light to detect/image an object. Moreover, a light steering receiver may also include a micro-mirror to select a direction of incident light to be detected by the receiver, to avoid detecting other unwanted signals.

An array of photodetectors is typically used for a LiDAR system. In optical detection systems such as a LiDAR system, photons from various directions are collected, mapped, and measured. A typical component for this purpose is a photodiode array. Pulses are emitted from a laser sequentially, and directed at different angles to reflect off objects in the environment. Returning pulses are photons that, depending on the return angle, will hit different ones of the photodiodes in the array. The photons from different angles are focused by a lens system to different pixels (photodiodes) in the photodiode array. However, due to manufacturing limitations, gaps exist between photodiodes (pixel elements). If photons from a certain incident direction are projected to a gap location, then the photons may not be able to generate a measurable electrical signal. On the other hand, if gaps between pixels are completely eliminated (i.e., using one large photodiode detector instead of an array of small photodiode detectors), no photon energy will be lost. However, spatial resolution is lost, since it is no longer possible to distinguish the incident direction of the photons. Additionally, the noise floor will also increase significantly with a large photodiode, due to its larger parasitic capacitance.

BRIEF SUMMARY OF THE INVENTION

Techniques disclosed herein relate generally to photodetectors. More specifically, and without limitation, disclosed herein is an apparatus and method for a single photodetector with an array of electrodes, to simulate a photodetector array but without the gaps of a photodetector array. The array of electrodes, instead of a single electrode, provides spatial resolution and allows the incident direction of the photons to be detected.

In one embodiment, a photodetector sufficiently large to receive an entire designed field of view is used. At least one lens is mounted to direct reflected laser beams to the photodetector. A plurality of electrodes (e.g., 16, 32 or 64) are coupled to the photodetector, each electrode corresponding to a different pixel position. A processor is coupled to the plurality of electrodes and the processor is configured to detect a pixel position of a reflected laser beam by detecting which electrode produces the largest signal.

According to certain embodiments a plurality of operational amplifiers are provided, each operational amplifier being coupled to one of the plurality of electrodes. The amplifiers are configured to operate in the transimpedance mode. A plurality of analog-to-digital converters are provided, each analog-to-digital converter being coupled to one of the plurality of operational amplifiers. The processor is coupled to the plurality of analog-to-digital converters, and is configured to detect a pixel position of a reflected laser beam by detecting which analog-to-digital converter, and thus which electrode, produces the largest digital signal.

According to certain embodiments, the electrodes are a linear array of at least 32 electrodes. The photodetector is a photodiode, and in one embodiment is an avalanche photodiode. In one embodiment, the photodiode is more compact than a corresponding array of photodiodes with the same number of photodiodes as electrodes.

In another embodiment, a method for detecting different pulse positions with different electrodes on a single photodetector is disclosed. An entire designed field of view is received at a single photodetector. Reflected laser beams are directed to the photodetector with at least one lens. An amount of current generated in the photodetector is detected at a plurality of pixel positions using a plurality of electrodes. A pixel position of a reflected laser beam is detected by detecting which electrode produces the largest signal.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to the appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention, will be more apparent from the following detailed description taken in conjunction with the accompanying drawings, in which:

FIGS. 8A-B are diagrams of alternate structures for eliminating the gaps in an array of photodetectors according to embodiments;

FIG. 9 is a flowchart of a method for detecting different pulse positions with different electrodes on a single photodetector according to embodiments of the present invention;

DETAILED DESCRIPTION OF THE INVENTION

Figure 1:
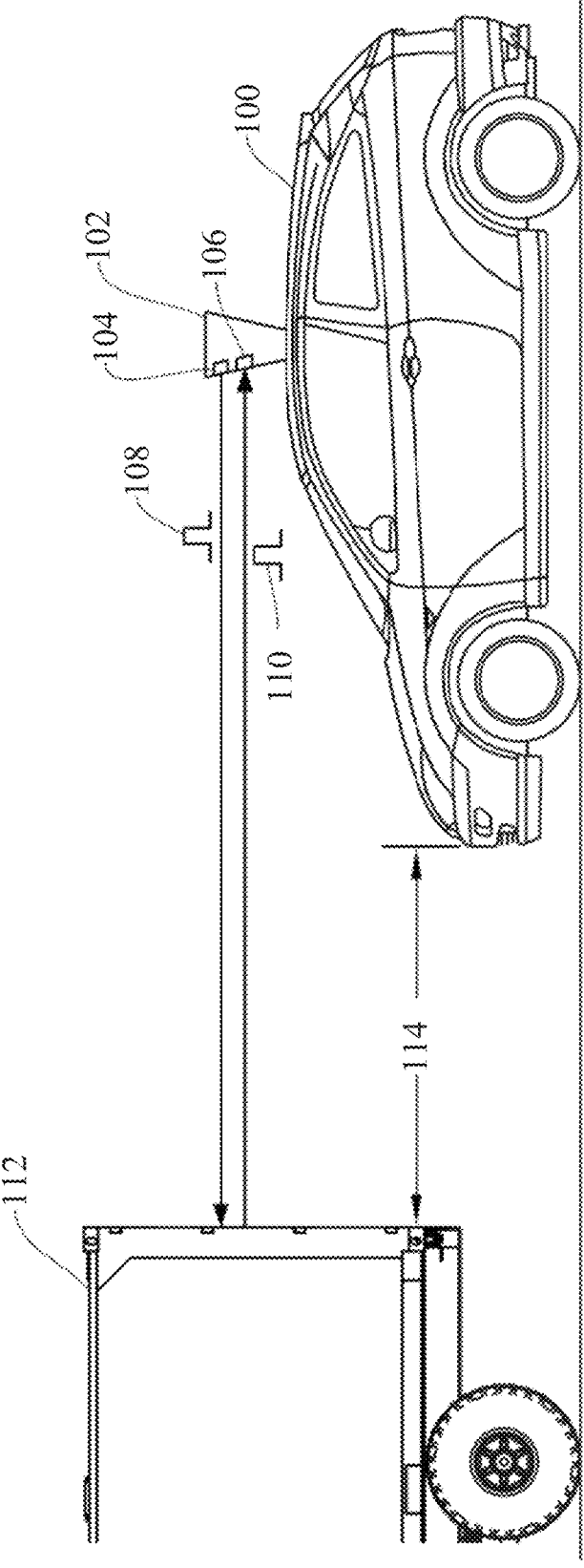
FIG. 1 shows an autonomous vehicle with a LiDAR system, according to certain embodiments.

Aspects of the present disclosure relate generally to a LiDAR system, and more particularly to an unique photodetector to improve performance.

In the following description, various examples of an unique photodetector with multiple electrodes are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

According to embodiments, this invention describes a method and apparatus for providing an unique photodetector with multiple electrodes. An apparatus has a photodetector 402 sufficiently large to receive an entire designed field of view. At least one lens 530 is mounted to direct reflected laser beams to the photodetector. A plurality of electrodes (404, 406, 408) are coupled to the photodetector, each electrode corresponding to a different pixel position. A processor 1020 is coupled to the plurality of electrodes and the processor is configured to detect a pixel position of a reflected laser beam by detecting which electrode produces the largest signal.

According to certain embodiments a plurality of operational amplifiers (616, 618, 629) are provided, each operational amplifier being coupled to one of the plurality of electrodes. The amplifiers are configured to operate in the transimpedance mode. A plurality of analog-to-digital converters (632, 634, 636) are provided, each analog-to-digital converter being coupled to one of the plurality of operational amplifiers. The processor is coupled to the plurality of analog-to-digital converters, and is configured to detect a pixel position of a reflected laser beam by detecting which analog-to-digital converter, and thus which electrode, produces the largest digital signal.

Typical System Environment for Certain Embodiments of the Invention

FIG. 1 illustrates an autonomous vehicle 100 in which the various embodiments described herein can be implemented. Autonomous vehicle 100 can include a LiDAR module 102. LiDAR module 102 allows autonomous vehicle 100 to perform object detection and ranging in a surrounding environment. Based on the result of object detection and ranging, autonomous vehicle 100 can drive according to the rules of the road and maneuver to avoid a collision with detected objects. LiDAR module 102 can include a light steering transmitter 104 and a receiver 106. Light steering transmitter 104 can project one or more light signals 108 at various directions (e.g., incident angles) at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light signal 110, and can perform a ranging determination (e.g., a distance of the object) based on a time difference between light signals 108 and 110, as would be appreciated by one of ordinary skill in the art with the benefit of this disclosure. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can thereby adjust its speed (e.g., slowing or stopping) to avoid collision with object 112 based on the detection and ranging of object 112 by LiDAR module 102.

Figure 2A:
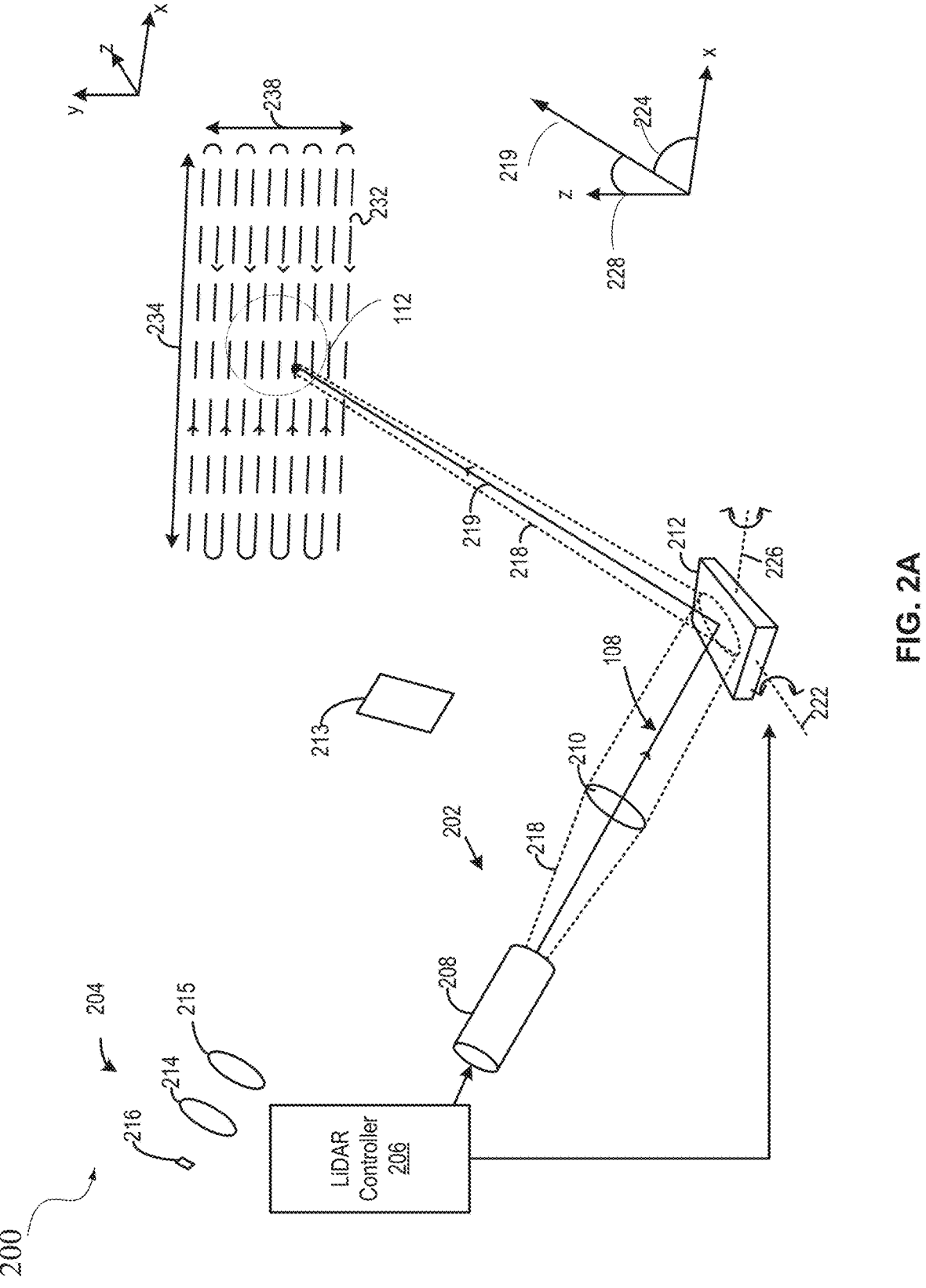
FIG. 2A shows an example of a light projection operation, according to certain embodiments.
Figure 2B:
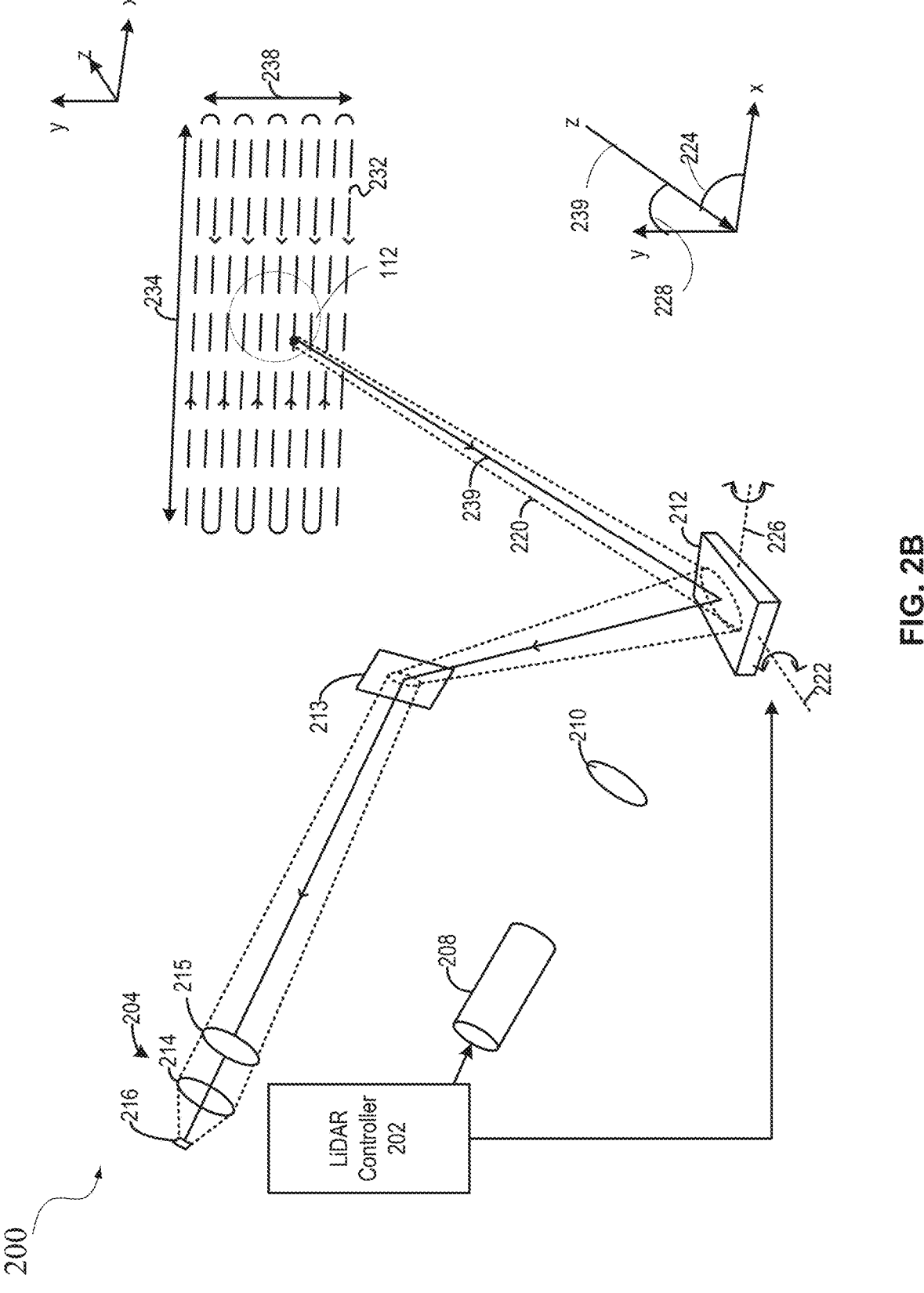
FIG. 2B shows an example of a light detection operation, according to certain embodiments.

FIG. 2A and FIG. 2B illustrate simplified block diagrams of an example of a LiDAR module 200 according to certain embodiments. LiDAR module 200 may be an example of LiDAR system 102, and may include a transmitter 202, a receiver 204, and LiDAR controller 206, which may be configured to control the operations of transmitter 202 and receiver 204. Transmitter 202 may include a light source 208 and a collimator lens 210, and receiver 204 can include a lens 214, an optional filter 215 and a photodetector 216. LiDAR module 200 may further include a mirror assembly 212 (also referred to as a "mirror structure") and a beam splitter 213. In some embodiments, LiDAR module 102, transmitter 202 and receiver 204 can be configured as a coaxial system to share mirror assembly 212 to perform light steering operations, with beam splitter 213 configured to reflect incident light reflected by mirror assembly 212 to receiver 204.

FIG. 2A shows an example of a light projection operation, according to certain embodiments. To project light, LiDAR controller 206 can control light source 208 (e.g., a pulsed laser diode, a source of FMCW signal, AMCW signal, etc.) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light beam 218 to steer it along an output projection path 219 towards object 112. Mirror assembly 212 can include one or more rotatable mirrors. FIG. 2A illustrates mirror assembly 212 as having one mirror; however, a micro-mirror array may include multiple micro-mirror assemblies that can collectively provide the steering capability described herein. Mirror assembly 212 can further include one or more actuators (not shown in FIG. 2A) to rotate the rotatable mirrors. The actuators can rotate the rotatable mirrors around a first axis 222, and can rotate the rotatable mirrors along a second axis 226. The rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated light beam 218 to form a reflected light signal, which can be received by receiver 204 and detected by the LiDAR module, as further described below with respect to FIG. 2B. In certain embodiments, mirror assembly 212 can include one or more comb spines with comb electrodes (see, e.g., FIG. 3), as will be described in further detail below.

FIG. 2B shows an example of a light detection operation, according to certain embodiments. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214 and an optional filter 215. With such arrangements, receiver 204 can selectively receive signals that are relevant for the ranging/imaging of object 112 (or any other object within the FOV), such as light signal 110 generated by the reflection of collimated light beam 218 by object 112, and not to receive other signals. As a result, the effect of environmental disturbance on the ranging and imaging of the object can be reduced, and the system performance may be improved.

Unified Photodiode and Array Electrodes

Figure 3:
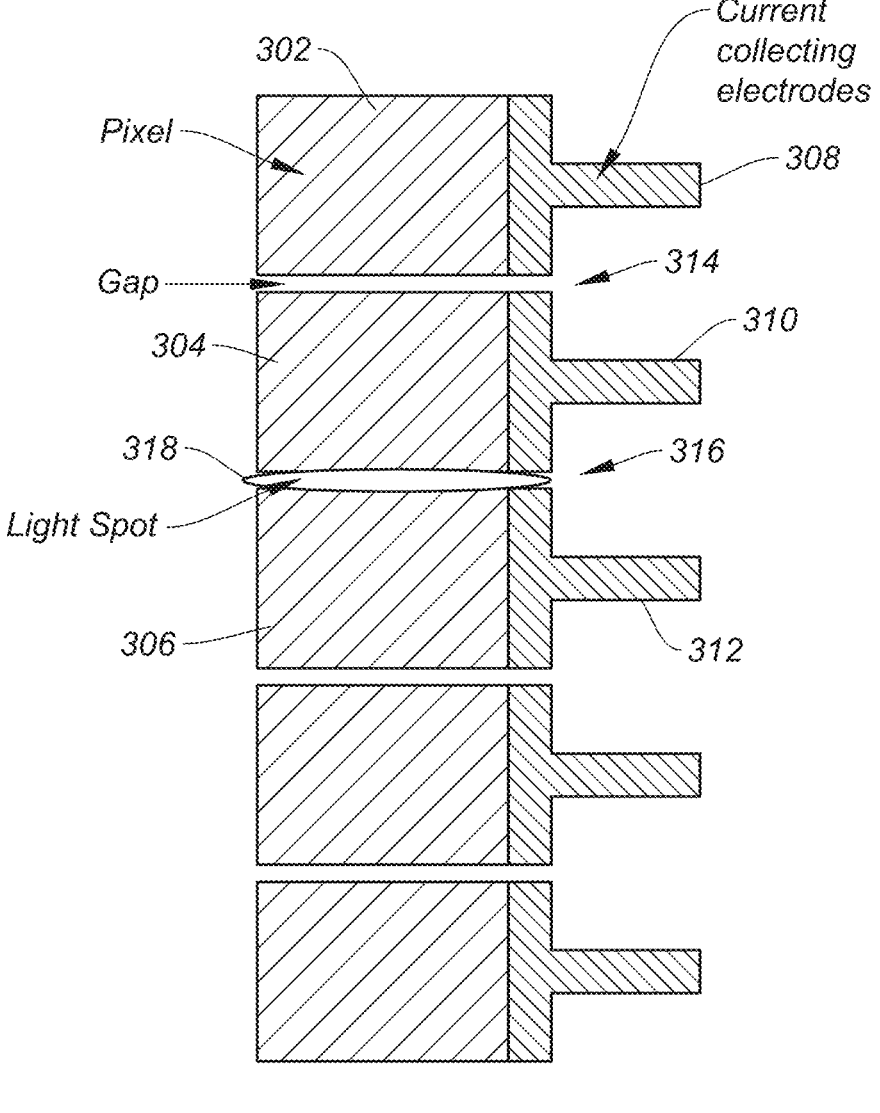
FIG. 3 is a block diagram of a prior art array of photodiodes.

FIG. 3 is a block diagram of a prior art array of photodiodes. Photodiodes 302, 304, 306, etc. are arranged in an array. Each photodiode is connected to a separate electrode 308, 310, 312, etc. These electrodes collect the current generated and provide it to a detection circuit. Each photodiode corresponds to a pixel of light. As can be seen, there are gaps between adjacent photodiodes due to manufacturing limitations, such as gaps 314 and 316. These gaps can cause some of the photons to be lost. As shown, a photon or light spot 318 hits gap 316, and thus is not detected by any of the photodiodes. Also, a light spot can only partially hit a photodiode, with some of the energy hitting a gap. This will make the detected signal smaller, and may make it indistinguishable from noise.

Figure 4:
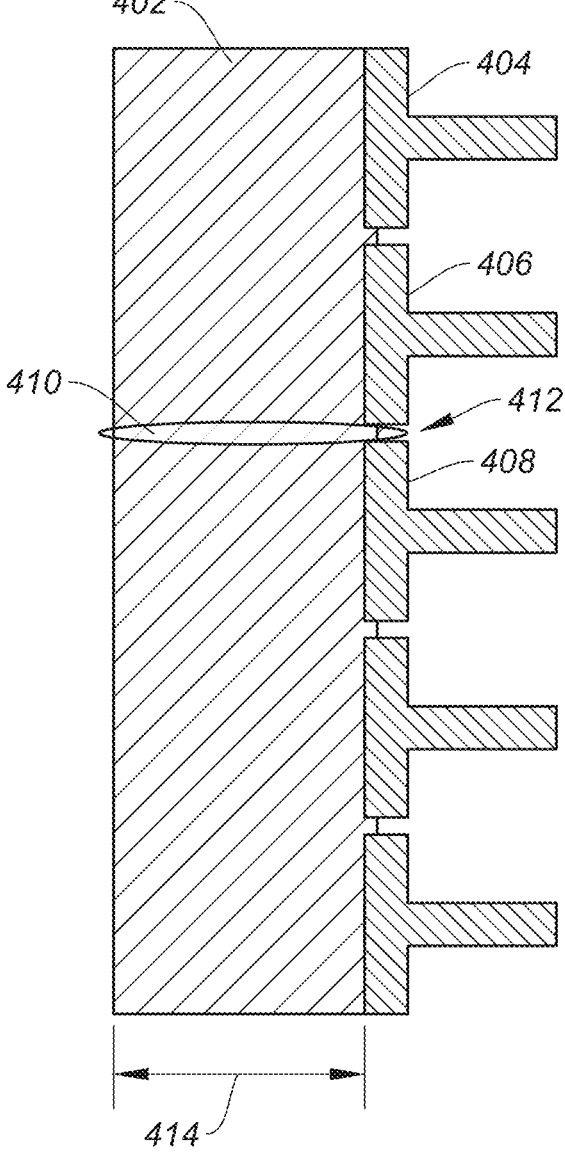
FIG. 4 is a diagram of single photodetector with an array of electrodes according to an embodiment.

FIG. 4 is a diagram of single photodetector with an array of electrodes according to an embodiment. A single, wide photodetector 402 is provided, with multiple electrodes 404, 406, 408, etc. In one embodiment, the thickness 414 of the photodetector is 0.2-0.5 mm, or 0.1-1.0 mm. The photodetector is 10-30 mm long in one embodiment, or about 20 mm. There are gaps between the electrodes, such as a gap 412. In one embodiment, the gap is around 50 micrometers or between 10-200 micrometers. However, a light spot 410 that hits gap 412 passes through photodetector 402 and generates current. Most of that current will be detected by adjacent electrodes 406 and 408. If the amount of current in electrodes 406 and 408 is identical, it can be determined that the light spot hit the gap 412. If the light spot hits the edge of electrode 408, more current will be detected by electrode 408 than electrode 406. If the light spot partially hits the gap, and partially hits the edge of electrode 406, electrode 406 will detect more, but electrode 408 will detect some. Electrode 406 will be considered the pixel position of the light spot. In one embodiment, resolution to a particular electrode is sufficient. Alternately, a sub-pixel position of the light spot could be determined by interpolation between the electrodes detecting the largest amount of energy. For example, if the signal at electrode 406 is twice the amplitude of the signal at electrode 408, the light spot position will be $\frac{1}{3}$ the distance between the center of electrode 406 and the center of electrode 408.

Figure 5:
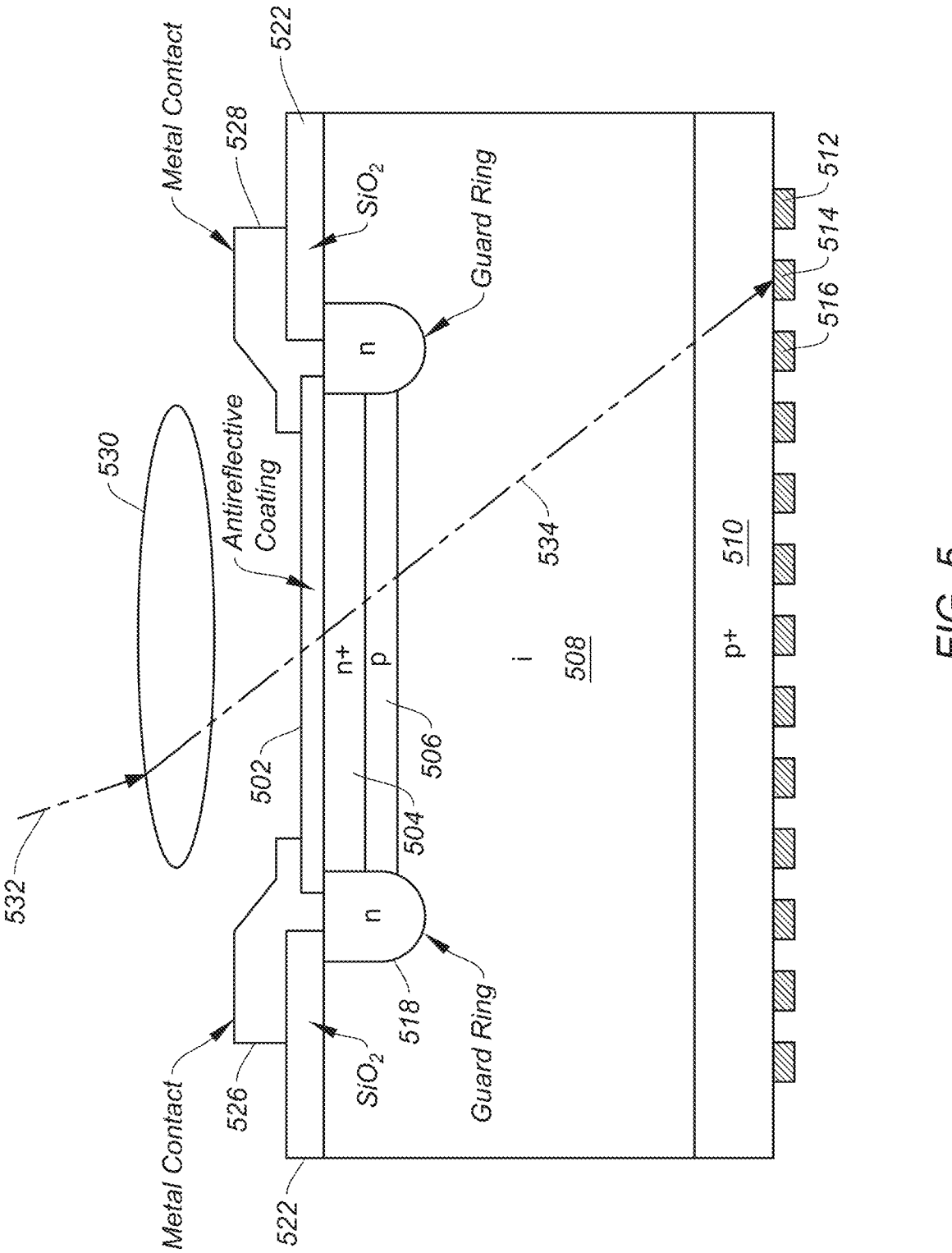
FIG. 5 is a diagram of a photodiode implementation of the single photodetector with an array of electrodes of FIG. 4 according to an embodiment.

FIG. 5 is a diagram of an avalanche photodiode implementation of the single photodetector with an array of electrodes of FIG. 4 according to an embodiment. The top of the photodiode has an antireflective coating 502. Below is an avalanche region composed of n+ region 504 and p region 506. Region 508 is the conversion region. Below the conversion region is a p+ region 510, followed by multiple electrodes 512, 514, 516, etc.

An n-doped guard ring 512 surrounds the avalanche region 504, 506. Although a cross-section is shown, guard ring 512 forms a ring entirely enclosing the avalanche region. An insulating $SiO_2$ layer 522 partially covers guard ring 518, allowing room for metal contacts 526, 528. Metal contacts 526, 528 form the cathode of the Avalanche Photo-Diode (APD), while multiple electrodes 512, 514, 516, etc. form the anode of the APD.

A lens 530 is used to redirect an incoming photon 532 to an electrode in the array of electrodes 512, 514, 516, etc., such as in direction 534 to electrode 514 as shown. After lens 530, and optionally other lenses in a lens system, photons from a certain direction are intentionally focused to a elliptically-shaped light spot. In the design shown, the APD will collect all the photon energy. The lens system will focus the incoming light from a designed field of view (FOV) to spread that FOV across all the electrodes to maximize the detection area. The lens system can extend the range covered so that electrodes can be under the guard rings, which would normally block light, so that no gaps are left.

The guard ring is one of the reasons that the gaps between APDs cannot be reduced significantly. In an alternate embodiment, multiple avalanche areas are used with one guard ring enclosing the entire APD array. A lens array captures light that would normally hit the guard ring, and expands it to reach an electrode.

Figure 6:
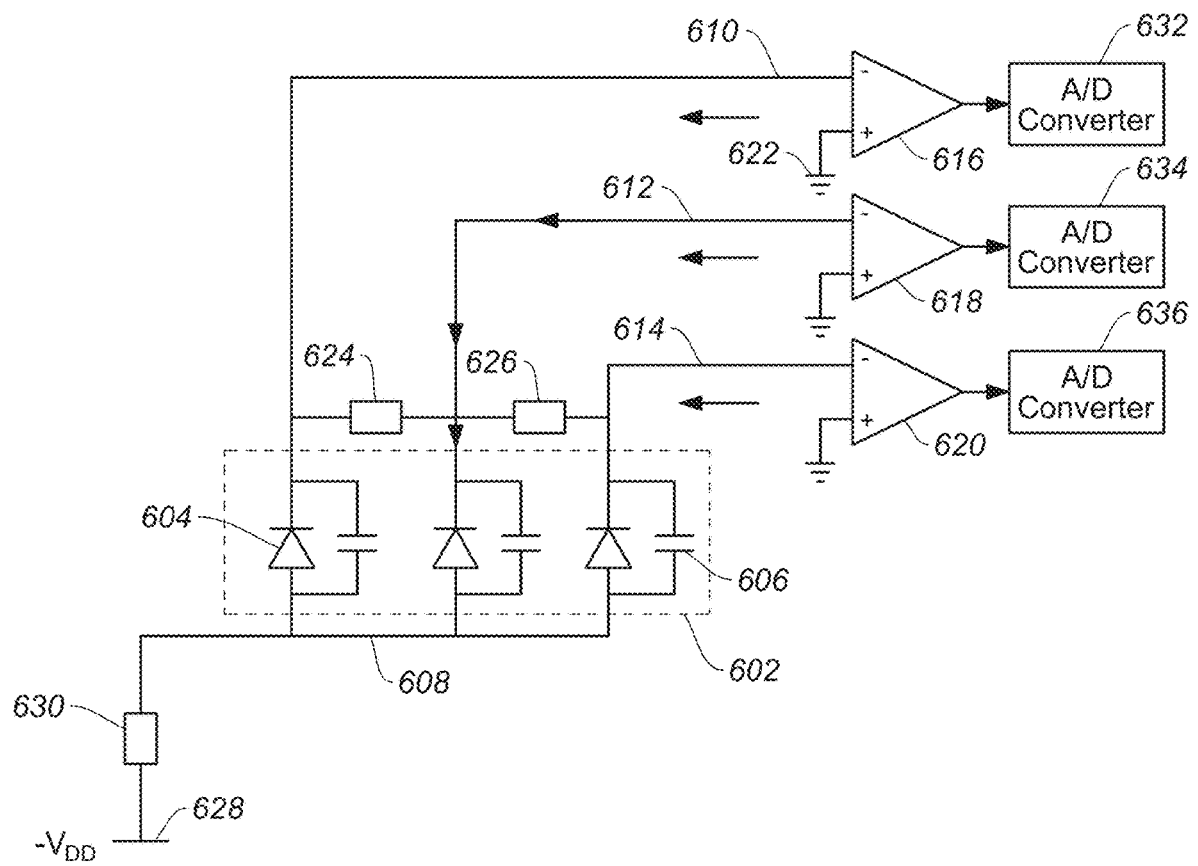
FIG. 6 is a diagram of a detection circuit for a single photodetector with an array of electrodes according to an embodiment.

FIG. 6 is a diagram of a detection circuit for a single photodetector with an array of electrodes according to an embodiment. A single photodetector 602 is represented as an array of individual photodiodes 604 and corresponding parasitic capacitances 606. Commonly connected contact or contacts 608 form the cathode of the APD. The multiple electrodes, the anodes, are shown by lines 610, 612, 614. Three are shown for illustration, while in practice, many more may be used. In embodiments, the array includes 8, 12, 16, 32, 64 or any other number of anode electrodes. The electrodes can be arranged in a linear array in one embodiment. In another embodiment, the electrodes are arranged in a two-dimensional array. A one dimensional array may be used where the LiDAR detects objects in the same plane, horizontally. A two dimensional array may be used when the LiDAR detects objects in multiple directions, both horizontally and vertically.

The anode lines 610, 612, 614 are connected to the negative input of operational amplifiers 616, 618, 620, etc., respectively. Each operational amplifier has its positive input connected to ground, such as shown by connection 622 to ground for operational amplifier 616. The cathode 608 of photodetector 602 is connected to VDD 628 through a resistor 630. The resistor 630 is provided because without it, the APD works in constant bias voltage mode. The resistor will change the working mode towards a constant current bias. Another purpose of the resistor is to quench the current when large signals arrive, therefore protecting the APD. In between anode electrode lines 610, 612, 614 are resistors 624 and 626. These resistors 624 and 626 represent the native/intrinsic resistance between the units of the APD array. The circuit has all the amplifiers operating in transimpedance amplification mode, such that the input current is converted into a proportional output voltage. Thus, mainly photon generated current from the nearest electrode is collected, with further electrodes collecting much less. The drawback of this approach is some cross-talking due to the lack of physical pixel gaps; however this is overcome by detecting the largest voltage signal. The elimination of physical gaps ensures photons from arbitrary incident angles are collected.

The operational amplifiers 616, 618, 620, etc., produce analog outputs. These analog outputs are provided to analog-to-digital converters 632, 634, 636, etc., respectively. The outputs of analog-to-digital converters 632, 634, 636 are digital signals that are provided to a processor for analysis (e.g., processor 1020 or 1102 of FIGS. 10-11).

In alternate embodiments, the detection could be done in the analog domain, without analog-to-digital converters. The maximum voltage could be detected at the output of the operational amplifiers. In one embodiment, in addition to the location of the light pulse, the size of the light pulse is detected. This can provide information on the distance to an object, and/or the reflectivity of an object.

Figure 7:
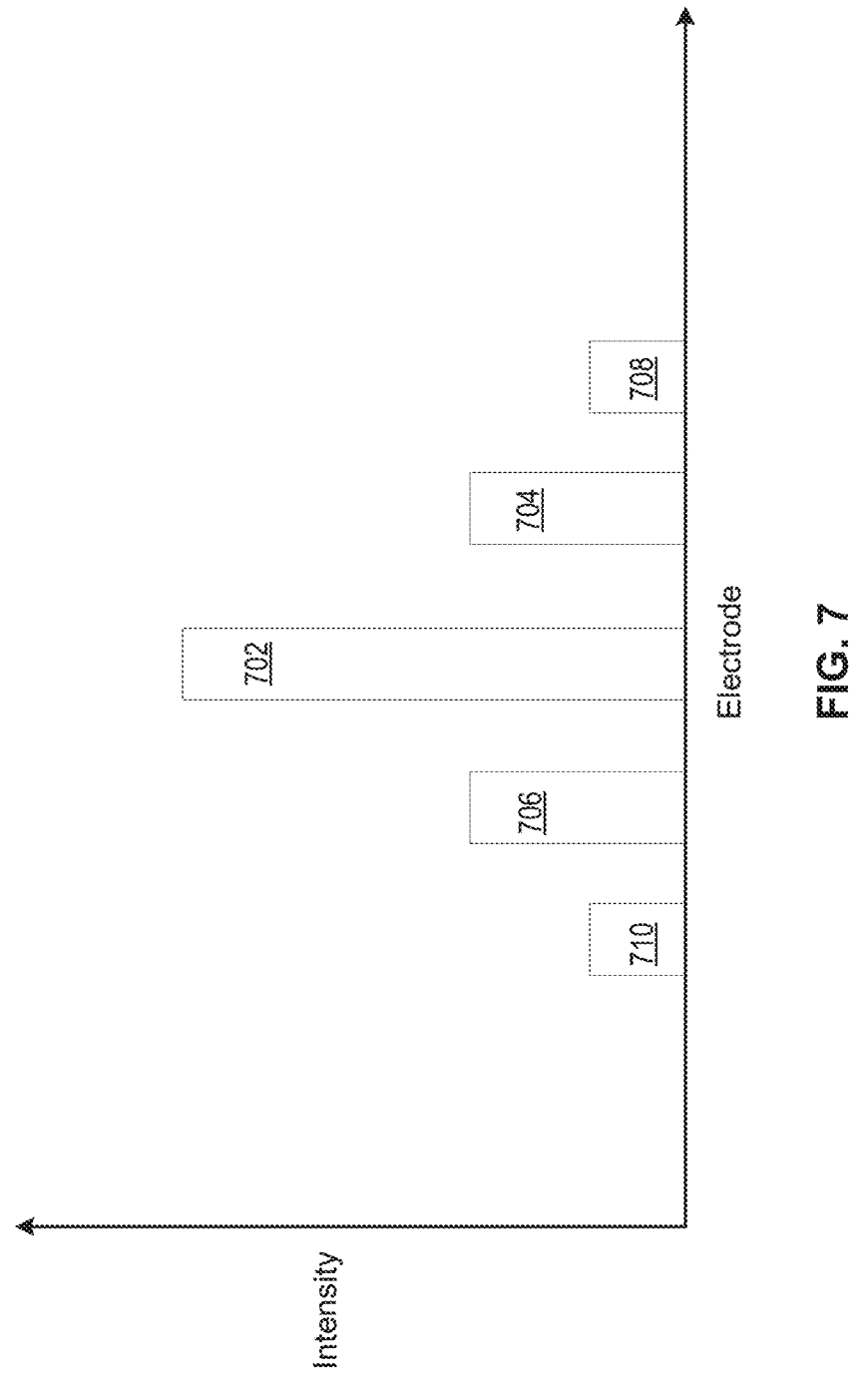
FIG. 7 is a diagram of the crosstalk detection of light by adjacent electrodes according to an embodiment.

FIG. 7 is a diagram of the crosstalk detection of light by adjacent electrodes according to an embodiment. The digitized values of light intensity detected at each electrode are illustrated by bars 702-710. As can be seen, bar 702 has the highest value, indicating the photon has hit closest to its corresponding electrode of the photodetector. Because a single photodetector with multiple electrodes is used, some of the current will be detected at adjacent electrodes, although in decreasing amounts. Bars 704 and 706 indicate the intensity detected at the two adjacent electrodes. Bars 708 and 710 indicate the intensity detected at electrodes once removed, on either side of the electrodes producing bars 704 and 706. The various digital values are provided to a processor, which will search for the highest value, 702, to determine the location of the photon or light spot hitting the photodetector. Alternately, if the values are not symmetrical as shown in FIG. 7, the processor could interpolate the exact location of the maximum light spot between the centers of the two electrodes with the largest values.

FIGS. 8A-B are diagrams of alternate structures for eliminating the gaps in an array of photodetectors according to embodiments. In the embodiment of FIG. 8A, photodiodes 810, 812, 814, etc. have a stair step shape. Thus, a photon or light spot 816 that hits a gap will always hit part of one of the photodetectors. Here, it is known that a light spot at gap 816 is detected by electrode 812. Thus, the pixel area for electrode 812 includes gap 816. FIG. 8B illustrates an alternate configuration, where electrodes 818, 820 and 822 are angled behind each other, so that the gaps are not perpendicular to the path of the incoming photons. Thus, a photon 824 will not simply hit a gap and be missed, but will impact part of one of the photodetectors. The same detection circuitry as illustrated in FIG. 6 may be used.

Flowchart for Method for Detecting Different Light Pulse Positions with a Single Photodetector.

FIG. 9 is a flowchart of a method for detecting different pulse positions with different electrodes on a single photodetector according to embodiments of the present invention. Step 902 is receiving an entire designed field of view with a single photodetector. Reflected laser beams are directed to the photodetector with at least one lens (step 904). An amount of current generated in the photodetector is detected at a plurality of pixel positions using a plurality of electrodes (step 906). A pixel position of a reflected laser beam is detected by detecting which electrode produces the largest digital signal (step 908).

In summary, in one embodiment, an apparatus for beam steering in a Light Detection and Ranging (LiDAR) system of an autonomous vehicle is provided. The apparatus comprises the following elements:

a photodetector 402 sufficiently large to receive an entire designed field of view of the LiDAR system;

at least one lens 530 mounted to direct reflected laser beams to the photodetector;

a plurality of electrodes (512, 514, 516) coupled to the photodetector, each electrode corresponding to a different pixel position;

a plurality of operational amplifiers (616, 618, 620), each operational amplifier being coupled to one of the plurality of electrodes;

a plurality of analog-to-digital converters (632, 634, 636), each analog-to-digital converter being coupled to one of the plurality of operational amplifiers; and a processor (1020), coupled to the plurality of analog-to-digital converters, the processor being configured to detect a pixel position of a reflected laser beam by detecting which analog-to-digital converter, and thus which electrode, produces the largest digital signal.

In another embodiment, method is provided. The method comprises the following steps:

receiving (902) an entire designed field of view with a single photodetector (402);

directing (904) reflected laser beams to the photodetector with at least one lens (530);

detecting (906) an amount of current generated in the photodetector at a plurality of pixel positions using a plurality of electrodes (512, 514, 516); and detecting (908) a pixel position of a reflected laser beam by detecting which electrode produces the largest signal.

Example LiDAR System Implementing Aspects of Embodiments Herein

Figure 10:
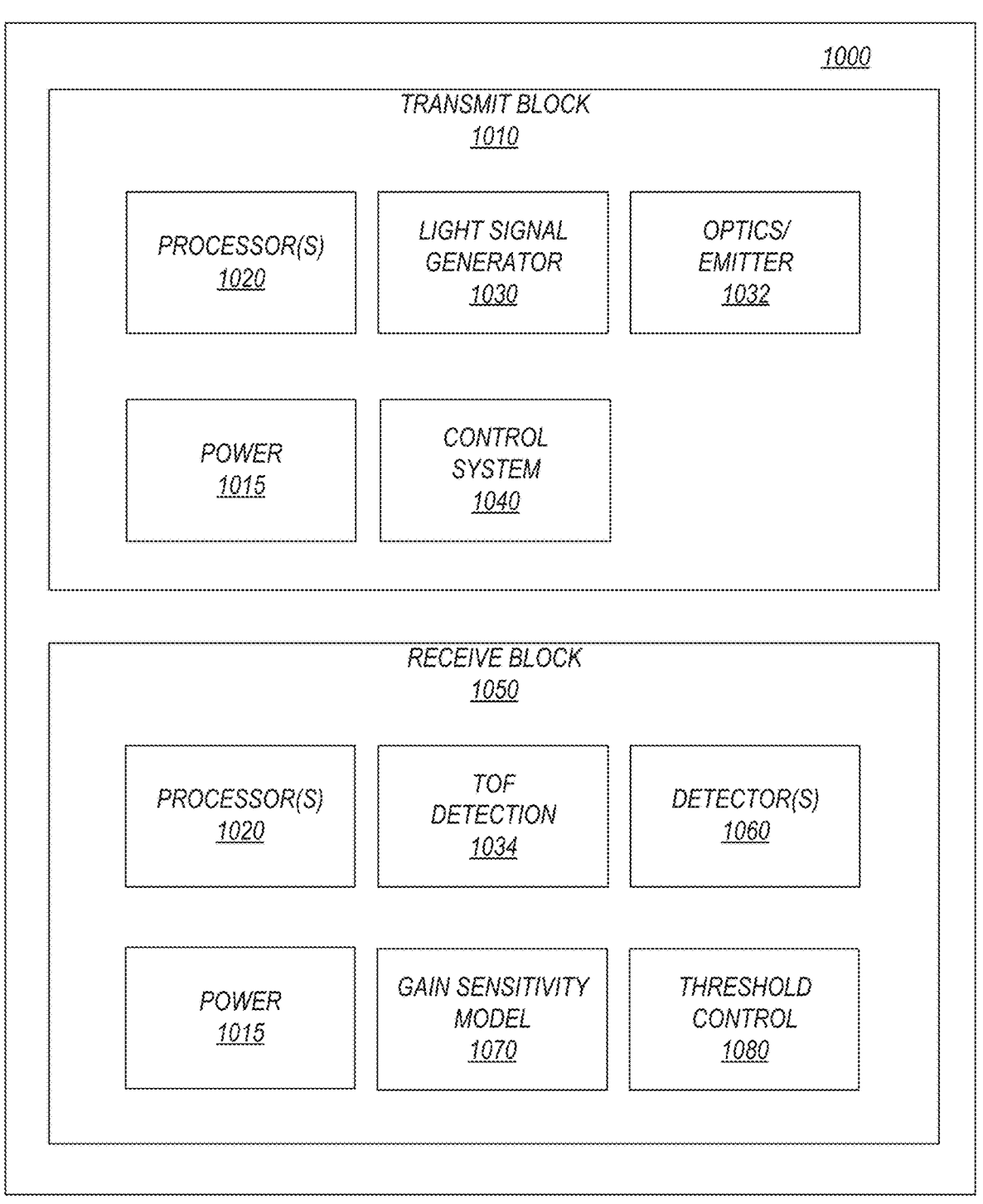
FIG. 10 illustrates a simplified block diagram showing aspects of a LiDAR-based detection system, according to certain embodiments of the invention.

FIG. 10 illustrates a simplified block diagram showing aspects of a LiDAR-based detection system 1000, according to certain embodiments, in which the embodiments described above can be imbedded and controlled. System 1000 may be configured to transmit, detect, and process LiDAR signals to perform object detection as described above with regard to LiDAR system 1000 described in FIG. 1. In general, a LiDAR system 1000 includes one or more transmitters (e.g., transmit block 1010) and one or more receivers (e.g., receive block 1050). LiDAR system 1000 may further include additional systems that are not shown or described to prevent obfuscation of the novel features described herein.

Transmit block 1010, as described above, can incorporate a number of systems that facilitate that generation and emission of a light signal, including dispersion patterns (e.g., 360 degree planar detection), pulse shaping and frequency control, Time-Of-Flight (TOF) measurements, and any other control systems to enable the LiDAR system to emit pulses in the manner described above. In the simplified representation of FIG. 10, transmit block 1010 can include processor(s) 1020, light signal generator 1030, optics/emitter module 1032, power block 1015 and control system 1040. Some or all of system blocks 1030-1040 can be in electrical communication with processor(s) 1020.

In certain embodiments, processor(s) 1020 may include one or more microprocessors (μCs) and can be configured to control the operation of system 1000. Processor(s) 1020 may be connected to the outputs of A/D converters 616-620, etc., of FIG. 6, either directly or through intermediate circuitry. Alternatively or additionally, processor 1020 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 1000. For example, control system block 1040 may include a local processor to certain control parameters (e.g., operation of the emitter). In particular, the outputs of analog converters 632, 634, 636 can be provided to such a local processor for analysis. Processor(s) 1020 may control some or all aspects of transmit block 1010 (e.g., optics/emitter 1032, control system 1040, dual sided mirror 220 position as shown in FIG. 1, position sensitive device 250, etc.), receive block 1050 (e.g., processor(s) 1020) or any aspects of LiDAR system 1000. In some embodiments, multiple processors may enable increased performance characteristics in system 1000 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

cessing can be performed by analog electronic design, as would be understood by one of ordinary skill in the art.

Light signal generator 1030 may include circuitry (e.g., a laser diode) configured to generate a light signal, which can be used as the LiDAR send signal, according to certain embodiments. In some cases, light signal generator 1030 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1200 nm, although other wavelengths are possible, as would be appreciated by one of ordinary skill in the art.

Optics/Emitter block 1032 (also referred to as transmitter 1032) may include one or more arrays of mirrors for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 1032 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power block 1015 can be configured to generate power for transmit block 1010, receive block 1050, as well as manage power distribution, charging, power efficiency, and the like. In some embodiments, power management block 1015 can include a battery (not shown), and a power grid within system 1000 to provide power to each subsystem (e.g., control system 1040, etc.). The functions provided by power management block 1015 may be subsumed by other elements within transmit block 1010, or may provide power to any system in LiDAR system 1000. Alternatively, some embodiments may not include a dedicated power block and power may be supplied by a number of individual sources that may be independent of one another.

Control system 1040 may control aspects of light signal generation (e.g., pulse shaping), optics/emitter control, TOF timing, or any other function described herein. In some cases, aspects of control system 1040 may be subsumed by processor(s) 1020, light signal generator 1030, or any block within transmit block 1010, or LiDAR system 1000 in general.

Receive block 1050 may include circuitry configured to detect and process a return light pulse to determine a distance of an object, and in some cases determine the dimensions of the object, the velocity and/or acceleration of the object, and the like. Processor(s) 1065 may be configured to perform operations such as processing received return pulses from detectors(s) 1060, controlling the operation of TOF module 1034, controlling threshold control module 1080, or any other aspect of the functions of receive block 1050 or LiDAR system 1000 in general.

TOF module 1034 may include a counter for measuring the time-of-flight of a round trip for a send and return signal.

In some cases, TOF module 1034 may be subsumed by other modules in LiDAR system 1000, such as control system 1040, optics/emitter 1032, or other entity. TOF modules 1034 may implement return "windows" that limit a time that LiDAR system 1000 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 1034 may operate independently or may be controlled by other system block, such as processor(s) 1020, as described above. In some embodiments, the transmit block may also include a TOF detection module. One of ordinary skill in the art with the benefit of this disclosure would appreciate the many modifications, variations, and alternative ways of implementing the TOF detection block in system 1000.

Detector(s) 1060 may detect incoming return signals that have reflected off of one or more objects. In particular, detector 1060 may be detector 402 of FIG. 4, the APD of FIG. 5, or photodetector 602 of FIG. 6. In some cases, LiDAR system 1000 may employ spectral filtering based on wavelength, polarization, and/or range to help reduce interference, filter unwanted frequencies, or other deleterious signals that may be detected. In particular, a narrow passband filter can be used, either static or dynamic. A passband as narrow as 20 or even 15 nm may be used. Typically, detector(s) 1060 can detect an intensity of light and records data about the return signal (e.g., via coherent detection, photon counting, analog signal detection, or the like). Detector (s) 1060 can use any suitable photodetector technology including solid state photodetectors (e.g., silicon avalanche photodiodes, complimentary metal-oxide semiconductors (CMOS), charge-coupled devices (CCD), hybrid CMOS/ CCD devices) or photomultipliers. In some cases, a single receiver may be used or multiple receivers may be configured to operate in parallel.

Gain sensitivity model 1070 may include systems and/or algorithms for determining a gain sensitivity profile that can be adapted to a particular object detection threshold. The gain sensitivity profile can be modified based on a distance (range value) of a detected object (e.g., based on TOF measurements). In some cases, the gain profile may cause an object detection threshold to change at a rate that is inversely proportional with respect to a magnitude of the object range value. A gain sensitivity profile may be generated by hardware/software/firmware, or gain sensor model 1070 may employ one or more look up tables (e.g., stored in a local or remote database) that can associate a gain value with a particular detected distance or associate an appropriate mathematical relationship there between (e.g., apply a particular gain at a detected object distance that is 10% of a maximum range of the LiDAR system, apply a different gain at 15% of the maximum range, etc.). In some cases, a Lambertian model may be used to apply a gain sensitivity profile to an object detection threshold. The Lambertian model typically represents perfectly diffuse (matte) surfaces by a constant bidirectional reflectance distribution function (BRDF), which provides reliable results in the LiDAR system as described herein. However, any suitable gain sensitivity profile can be used including, but not limited to, Oren-Nayar model, Nanrahan-Krueger model, Cook-Torrence model, Diffuse BRDF model, Limmel-Seeliger model, Blinn-Phong model, Ward model, HTSG model, Fitted Lafortune model, or the like. One of ordinary skill in the art with the benefit of this disclosure would understand the many alternatives, modifications, and applications thereof.

Threshold control block 1080 may set an object detection threshold for LiDAR system 1000. For example, threshold control block 1080 may set an object detection threshold over a certain full range of detection for LiDAR system 1000. The object detection threshold may be determined based on a number of factors including, but not limited to, noise data (e.g., detected by one or more microphones) corresponding to an ambient noise level, and false positive data (typically a constant value) corresponding to a rate of false positive object detection occurrences for the LiDAR system. In some embodiments, the object detection threshold may be applied to the maximum range (furthest detectable distance) with the object detection threshold for distances ranging from the minimum detection range up to the maximum range being modified by a gain sensitivity model (e.g., Lambertian model).

Although certain systems may not be expressly discussed, they should be considered as part of system 1000, as would be understood by one of ordinary skill in the art. For example, system 1000 may include a bus system (e.g., CAMBUS) to transfer power and/or data to and from the different systems therein. In some embodiments, system 1000 may include a storage subsystem (not shown). A storage subsystem can store one or more software programs to be executed by processors (e.g., in processor(s) 1020). It should be understood that "software" can refer to sequences of instructions that, when executed by processing unit(s) (e.g., processors, processing devices, etc.), cause system 1000 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 1000 may include aspects of gain sensitivity model 1070, threshold control 1080, control system 1040, TOF module 1034, or any other aspect of LiDAR system 1000. The software includes programs for determining a pixel position of received light on the plurality of electrodes, and interpolating as needed. In addition, the software can provide for noise reduction or other cleanup of the received signals.

It should be appreciated that system 1000 is meant to be illustrative and that many variations and modifications are possible, as would be appreciated by one of ordinary skill in the art. System 1000 can include other functions or capabilities that are not specifically described here. For example, LiDAR system 1000 may include a communications block (not shown) configured to enable communication between LiDAR system 1000 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 1000 is described with reference to particular blocks (e.g., threshold control block 1080), it is to be understood that these blocks are defined for understanding certain embodiments of the invention and it is not implied or intended that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 1000 may be combined with or operated by other sub-systems as informed by design. For example, power management block 1015 and/or threshold control block 1080 may be integrated with processor(s) 1020 instead of functioning as separate entities.

Example Computer Systems Implementing Aspects of Embodiments Herein

Figure 11:
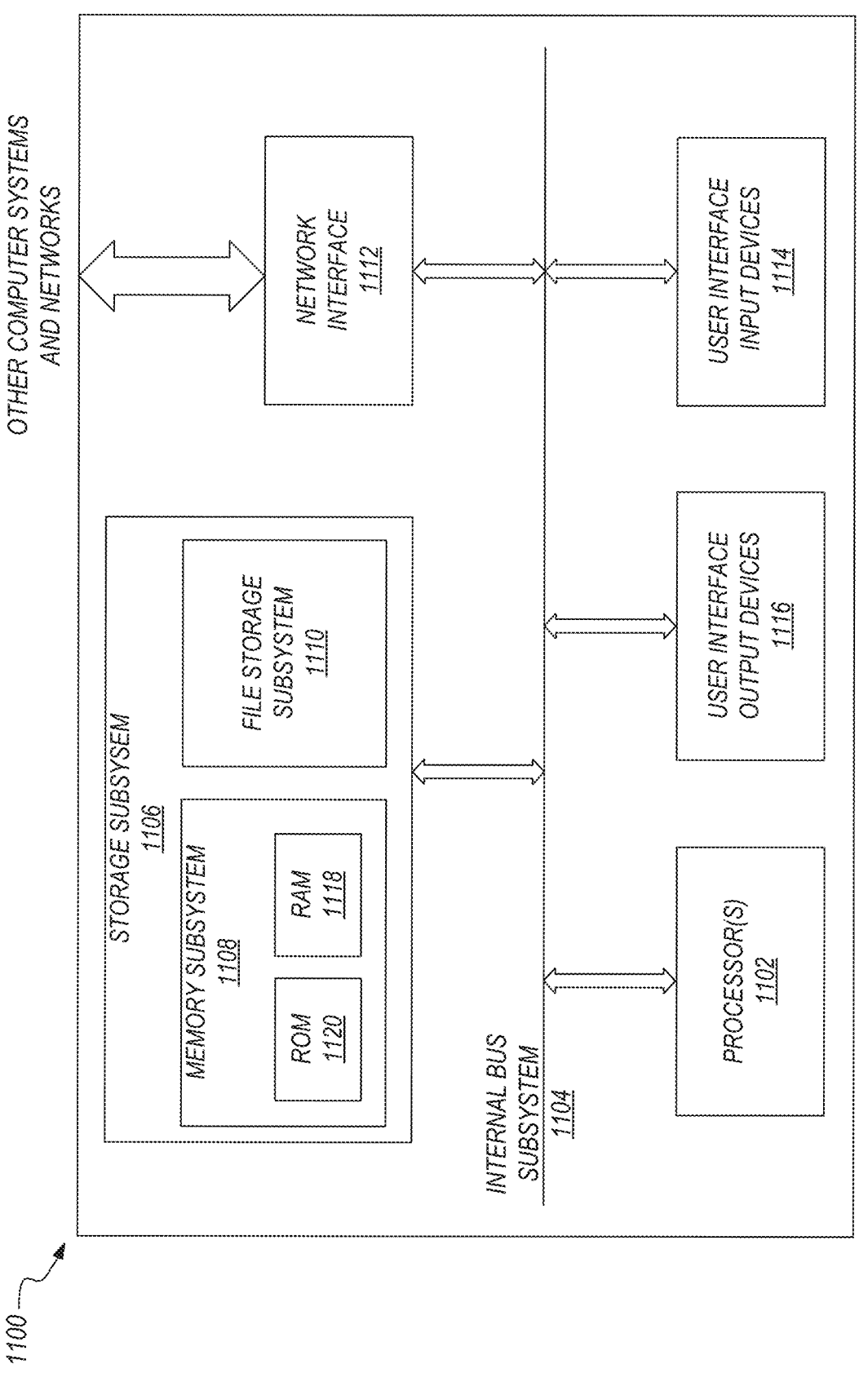
FIG. 11 illustrates an example computer system that may be utilized to implement techniques disclosed herein, according to certain embodiments of the invention.

FIG. 11 is a simplified block diagram of a computing system 1100 configured to operate aspects of a LiDAR-based detection system, according to certain embodiments. Computing system 1100 can be used to implement any of the systems and modules discussed above with respect to FIGS. 1-10. For example, computing system 1100 may operate aspects of threshold control 1080, TOF module 1034, processor(s) 1020, control system 1040, or any other element of LiDAR system 1000 or other system described herein. Computing system 1100 can include, for example, a field programmable gate array (FPGA), an application specific integrated circuit (ASIC), and a general purpose central processing unit (CPU), to implement the disclosed techniques, including the techniques described from FIG. 1-FIG. 9, such as a controller or processor for processing signals from the outputs of analog converters 632, 634, 636. In some examples, computing system 1100 can also one or more processors 1102 that can communicate with a number of peripheral devices (e.g., input devices) via a bus subsystem 1104. Processors 1102 can be an FPGA, an ASIC, a CPU, etc. These peripheral devices can include storage subsystem 1106 (comprising memory subsystem 1108 and file storage subsystem 1110), user interface input devices 1114, user interface output devices 1116, and a network interface subsystem 1112.

In some examples, internal bus subsystem 1104 (e.g., CAMBUS) can provide a mechanism for letting the various components and subsystems of computer system 1100 communicate with each other as intended. Although internal bus subsystem 1104 is shown schematically as a single bus, alternative embodiments of the bus subsystem can utilize multiple buses. Additionally, network interface subsystem 1112 can serve as an interface for communicating data between computing system 1100 and other computer systems or networks. Embodiments of network interface subsystem 1112 can include wired interfaces (e.g., Ethernet, CAN, RS232, RS485, etc.) or wireless interfaces (e.g., ZigBee, Wi-Fi, cellular, etc.).

In some cases, user interface input devices 1114 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computing system 1100. Additionally, user interface output devices 1116 can include a display subsystem, a printer, or non-visual displays such as audio output devices, etc. The display subsystem can be any known type of display device. In general, use of the term "output device" is intended to include all possible types of devices and mechanisms for outputting information from computing system 1100.

Storage subsystem 1106 can include memory subsystem 1108 and file/disk storage subsystem 1110. Subsystems 1108 and 1110 represent non-transitory computer-readable storage media that can store program code and/or data that provide the functionality of embodiments of the present disclosure. In some embodiments, memory subsystem 1108 can include a number of memories including main random access memory (RAM) 1118 for storage of instructions and data during program execution and read-only memory (ROM) 1120 in which fixed instructions may be stored. File storage subsystem 1110 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and not intended to limit embodiments of the present disclosure. Many other configurations having more or fewer components than system 1100 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the examples, alternative examples, etc., and the concepts thereof may be applied to any other examples described and/or within the spirit and scope of the disclosure.

For example, instead of using a single laser to illuminate the array of MEMS mirrors, an array of mirrors may be used. Also, the pattern generation and decoding could be hard-wired, in firmware or in software in different embodiments.

The structure of the present invention can be used in a variety of other applications than LIDAR. Light beam steering techniques can also be used in other optical systems, such as optical display systems (e.g., TVs), optical sensing systems, optical imaging systems, and the like. In various light beam steering systems, the light beam may be steered by, for example, a rotating platform driven by a motor, a multi-dimensional mechanical stage, a Galvo-controlled mirror, a resonant fiber, an array of microelectromechanical (MEMS) mirrors, or any combination thereof. A MEMS micro-mirror may be rotated around a pivot or connection point by, for example, a micro-motor, an electromagnetic actuator, an electrostatic actuator, or a piezoelectric actuator.

The MEMS mirror structure of the present invention can have the mirror mass driven by different types of actuators. In some light steering systems, the transmitted or received light beam may be steered by an array of micro-mirrors. Each micro-mirror may rotate around a pivot or connection point to deflect light incident on the micro-mirror to desired directions. The performance of the micro-mirrors may directly affect the performance of the light steering system, such as the field of view (FOV), the quality of the point cloud, and the quality of the image generated using a light steering system. For example, to increase the detection range and the FOV of a LiDAR system, micro-mirrors with large rotation angles and large apertures may be used, which may cause an increase in the maximum displacement and the moment of inertia of the micro-mirrors. To achieve a high resolution, a device with a high resonant frequency may be used, which may be achieved using a rotating structure with a high stiffness. It may be difficult to achieve this desired performance using electrostatic actuated micro-mirrors because comb fingers used in an electrostatic-actuated micro-mirror may not be able to provide the force and moment needed and may disengage at large rotation angles, in particular, when the aperture of the micro-mirror is increased to improve the detection range. Some piezoelectric actuators may be used to achieve large displacements and large scanning angles due to their ability to provide a substantially larger drive force than electrostatic-actuated types, with a relatively lower voltage.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. An apparatus for beam steering in a Light Detection and Ranging (LiDAR) system of an autonomous vehicle, the apparatus comprising:

a photodetector positioned to receive an entire field of view of the LiDAR system;

at least one lens mounted to direct reflected laser beams to the photodetector;

a plurality of electrodes coupled to the photodetector, each electrode corresponding to a different pixel position, wherein the plurality of electrodes are configured in a linear array along one side of the photodetector;

a plurality of operational amplifiers, each operational amplifier being coupled to a corresponding one of the plurality of electrodes, wherein the plurality of operational amplifiers are configured to operate in a transimpedance amplification mode;

a plurality of analog-to-digital converters, each analog-to-digital converter being coupled to one of the plurality of operational amplifiers; and a processor, coupled to the plurality of analog-to-digital converters, the processor being configured to detect a pixel position of a reflected laser beam by detecting which analog-to-digital converter, and thus which electrode, produces the largest digital signal.

2. The apparatus of claim 1 wherein the photodetector is a photodiode.

3. The apparatus of claim 2 wherein the photodiode is an avalanche photodiode.

4. The apparatus of claim 1 wherein the plurality of electrodes comprises at least 32 electrodes.

5. An apparatus comprising:

a photodetector sufficiently large to receive an entire designed field of view;

at least one lens mounted to direct reflected laser beams to the photodetector;

a plurality of electrodes configured in a linear array and coupled to one side of the photodetector, each electrode corresponding to a different pixel position;

a processor, coupled to the plurality of electrodes, the processor being configured to detect a pixel position of a reflected laser beam by detecting which electrode produces the largest digital signal;

a plurality of operational amplifiers, each operational amplifier being coupled to one of the plurality of electrodes; and a plurality of analog-to-digital converters, each analog-to-digital converter being coupled to one of the plurality of operational amplifiers.

6. The apparatus of claim 5 wherein all the operational amplifiers are configured to operate in transimpedance amplification mode.

7. The apparatus of claim 5 further comprising:

at least one lens mounted to direct reflected laser beams to the photodetector.

8. The apparatus of claim 5 wherein the photodetector is a photodiode.

9. The apparatus of claim 8 wherein the photodiode is an avalanche photodiode.

10. The apparatus of claim 5 wherein the plurality of electrodes comprises at least 32 electrodes.

11. A method comprising:

receiving an entire designed field of view with a single photodetector, wherein the single photodetector has four sides with a plurality of electrodes configured in a linear array that are coupled to one of the four sides of the plurality of electrodes, and wherein each electrode of the plurality of electrodes correspond to a different pixel position of the single photodetector;

directing reflected laser beams to the single photodetector with at least one lens;

detecting an amount of current generated in the single photodetector at a plurality of pixel positions on the single photodetector using the plurality of electrodes; and detecting a pixel position of a reflected laser beam by detecting which electrode produces the largest signal.

12. The method of claim 11 further comprising:

detecting an amount of current generated in the single photodetector at each electrode using operational amplifiers operating in transimpedance amplification mode.

13. The method of claim 11 wherein the single photodetector is a photodiode, and further comprising:

operating the photodiode in an avalanche mode.

14. The method of claim 11 further comprising interpolating between electrodes to determine a pixel position.

* * * * *